United States Patent [19]
Gooley

[11] 3,863,067
[45] Jan. 28, 1975

[54] ORIENTATION INDICATING APPARATUS

[76] Inventor: Cornelius Leonard Gooley, 63 Staughton Rd., Victoria 3146, Australia

[22] Filed: July 23, 1973

[21] Appl. No.: 381,652

[30] Foreign Application Priority Data
July 24, 1972  Australia............................ 9802/72

[52] U.S. Cl................. 250/231 R, 33/366, 250/574
[51] Int. Cl. .......................... G01c 9/00, G01d 5/34
[58] Field of Search........ 250/231 R, 573, 574, 577; 33/366; 313/108 D

[56] References Cited
UNITED STATES PATENTS

| | | | |
|---|---|---|---|
| 2,252,727 | 8/1941 | Pepper............................ | 250/231 R |
| 2,427,902 | 9/1947 | Clifton et al. .................... | 250/231 R |
| 3,293,513 | 12/1966 | Biard et al. ...................... | 313/108 D |
| 3,371,424 | 3/1968 | Sweet................................... | 33/366 |

FOREIGN PATENTS OR APPLICATIONS

| 154,030 | 8/1963 | U.S.S.R................................. | 33/366 |
|---|---|---|---|

Primary Examiner—James W. Lawrence
Assistant Examiner—T. N. Grigsby
Attorney, Agent, or Firm—Lada, Parrty, Von Gehr, Goldsmith & Deschamps

[57] ABSTRACT

Orientation indicating apparatus for applying to a member to indicate when the member is in a chosen orientation including radiation emitting means and radiation receiving means for receiving radiation modulated by a bubble in a liquid charged chamber. The radiation receiving means preferably includes a switching network including a photo-sensitive ciruit member for activating signalling means to indicate the orientation of the member. The radiation emitting means is preferably a light source loacated at the end of an elongated liquid charged tube, light being deflected laterally from an end edge of the bubble to the photo-sensitive circuit member.

9 Claims, 3 Drawing Figures

ORIENTATION INDICATING APPARATUS

The present invention relates to orientation indicating apparatus for applying to a member to indicate when the member is in a chosen orientation. The apparatus may be used for indicating the orientation of a builder's spirit level, surveyor's sighting apparatus, firearm or any other member whose orientation is desired. Horizontal, vertical or other orientation may be indicated by the apparatus.

Common spirit levels used in the building trade to test the orientation or level of structural and other members include a liquid charged tube which leaves a bubble exposed for direct vision when the desired state of the level is indicated. Sometimes it is necessary to use level indicating apparatus where direct visual observation of a spirit level bubble is difficult or impossible.

Furthermore accurate indication of the orientation of a member has not generally heretofore been readily achievable with relatively simple and inexpensive apparatus.

An object of the present invention is to enable determination of the orientation of a member without the need for direct observation of an indicating bubble.

According to the present invention there is provided orientation indicating apparatus for applying to a member to indicate when the member is in a chosen orientation, said apparatus including: radiation modulating means having a chamber charged with modulating liquid defining an orientation bubble movable therein according to the orientation of the modulating means, radiation emitting means positioned to emit radiation into said chamber so as to impinge on said bubble depending on the orientation of the modulating means, and radiation receiving means including radiation detecting means positioned to receive radiation deflected laterally by said bubble and said receiving means being arranged to generate an identification signal when the radiation received from the bubble is at a maximum intensity; the arrangement and placement of the emitting means and detecting means relative to the modulating means being such that when the member is in the chosen orientation radiation from the emitting means passes through the modulating liquid, impinges on a near boundary of the bubble, and is deflected laterally thereby so as to be received with maximum intensity by the detecting means thus producing the identification signal.

The radiation receiving means may identify when the member is in the chosen orientation by either generating a signal at that orientation or interrupting a signal that is continuously generated when the member is not in the chosen orientation. The identification of the chosen orientation may be used as an end in itself such as to indicate to a builder when a structrual member is positioned as desired or may be used in an automatic process to instigate or stop some action. For example in an aircraft "automatic pilot" the apparatus may be used to activate flight corrective apparatus if the aircraft deviates froma level course.

The radiation emitting means may be located at an end of a longitudinal tube defining the chamber, the light being deflected laterally from an end edge of the bubble and thence impinging on the receiving means. In this embodiment an image of the emitting means is detected by the receiving means when the member is in the chosen orientation. This latter embodiment enables accurate indication of level since the radiation impinging on the receiving means is deflected from only a small portion of the edge of the bubble and hence small movement of the bubble reduces the radiation impinging on the receiving means.

In a preferred embodiment of the invention the chamber is defined by an elongated tube and the orientation bubble has a length greater than half the length of the tube. This embodiment is usable with the radiation emitting means located at the end of the chamber. The long bubble ensures that an emitting means image formed at an edge of the bubble, not being the edge from which the receiving means is located to receive radiation, will not be detected by the receiving means without a substantial change in the orientation of the member.

The radiation modulating means is preferably supported on a mounting base, the mounting base being adjustably mounted on the member so that the orientation of the modulating means may be adjusted to enable the apparatus to correctly identify when the member is in the chosen orientation. For example the modulating means may be pivotally mounted on a common builder's spirit level and the orientation of the modulating means be adjusted so that the apparatus identifies horizontal or vertical orientation simultaneously with the bubbles in the factory calibrated glass tubes of the spirit level.

The radiation receiving means preferably includes radiation detecting means sensitive to the intensity of radiation impinging thereon, for example a photoconductivity type cell or a photo-transistor; orientation signalling means; and a switching network for switching the signalling means in response to changes in intensity of radiation impinging on the detecting means. The switching network preferably includes a switching member having two discrete states, for example a transistor having an on-state and an off-state. The transistor may be switched on when the member is in the chosen orientation and switched off when the member is not in the chosen orientation or vice-versa.

The chamber, radiation emitting means and radiation sensing means may be encased in a prefabricated module in predetermined relationship to each other to thereby provide a replaceable component for the apparatus.

To enable indication of small changes in orientation the receiving means may be made operative at a critical orientation position of adjustment of the apparatus and movement from that critical position causes the surface tension holding the bubble to break thus rendering the receiving means inoperative. Thus there may be provided two chambers, one being tilted to the left of horizontal by an amount not quite enough to move the bubble from the central horizontal indicating position and a similarly tilted chamber tilted to the right. Very small movement of the apparatus from horizontal breaks the surface tension holding one of the bubbles and the apparatus will cease indicating horizontal.

The following description refers in more detail to the essential features and further optional features of the invention. To facilitate understanding of the invention, reference is made to the accompanying drawings where these features are illustrated in preferred form. It is to be understood however, that the essential and optional

3 features of the invention are not limited to the specific forms of these features as shown in the drawings.

IN THE DRAWINGS

Figure 2:
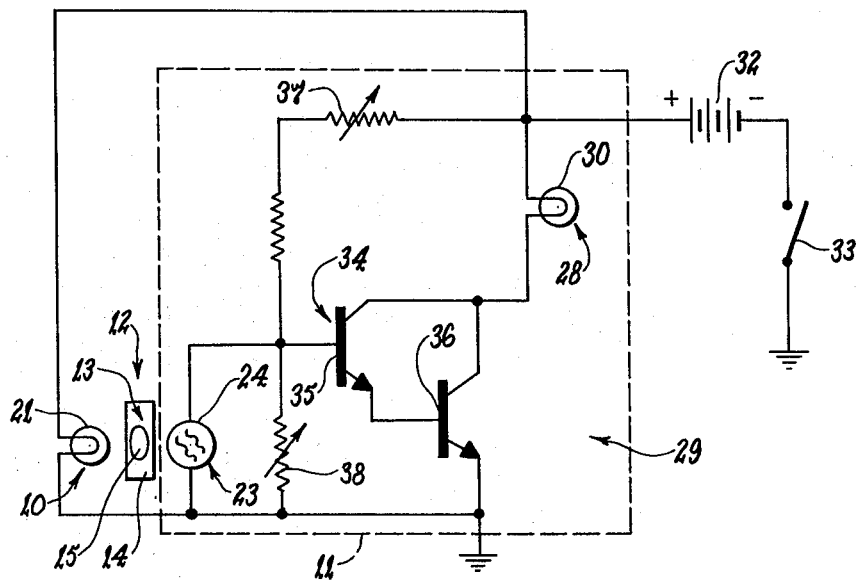
FIG. 2 is a circuit diagram representing one embodiment of apparatus according to the present invention.

FIG. 2 illustrates orientation indicating apparatus having radiation emitting means 10, radiation receiving means 11 and radiation modulating means 12. The radiation receiving means 11 receives radiation from the emitting means 10 modulated by the modulating means 12 which is interposed in the radiation path between the emitting and receiving means. The modulating means 12 has a chamber 13 charged with modulating liquid 14 defining an orientation bubble 15 movable in the chamber 13 according to the orientation of the modulating means 12.

Figure 1:
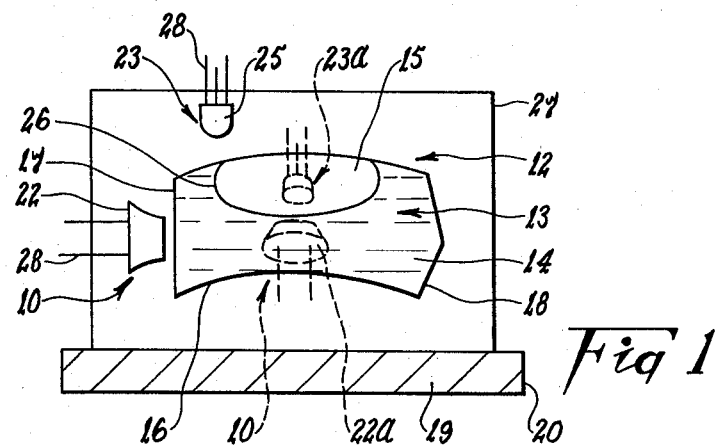
FIG. 1 is a schematic illustration of a replaceable component for use in the apparatus of the present invention.

The modulating means 12 is illustrated in FIG. 1 as an arcuate-shaped glass or plastics material elongated tube 16 closed at both ends 17 and 18. The modulating liquid 14 is preferably a spirit and may contain ethyl alcohol. The tube 16 may be of the conventional type used in builders' spirit levels. The mudulating means 12 alternatively may be an inverted saucer-shaped glass or plastics material container charged with a liquid and leaving an orientation bubble. The bubble 15 in FIG. 1 is elongated and has a length greater than half the length of the tube 16.

The modulating means 12 in FIG. 1 is supported on a mounting base 19 which can be adjustably mounted on the member whose orientation is to be indicated. The mounting base 19 may for example be pivotally mounted about base end 20 to a conventional spirit level so that end 17 of tube 16 can be raised or lowered to enable the apparatus to indicate horizontal in coincidence with the factory calibrated horizontal indication of the spirit level.

To facilitate identification of small departures of the member from the chosen orientation there may be provided two tubes 16 one being tilted to the left from a central chosen orientation indicating position by an amount insufficient to break the surface tension holding the bubble 15 in position. For common commercially available spirit level tubes this tilt would not normally exceed 5 seconds of arc. The second tube would be similarly tilted to the right. The receiving means would be sensitive to identify when both bubbles are in their chosen orientation indicating positions. Movement away from the chosen orientation will break the surface tension holding one of the bubbles in position and thus the apparatus would cease to indicate that the member is in the chosen orientation. Movements of the order of less than one second of arc may thus be detected by suitable calibration of the apparatus.

Figure 3:
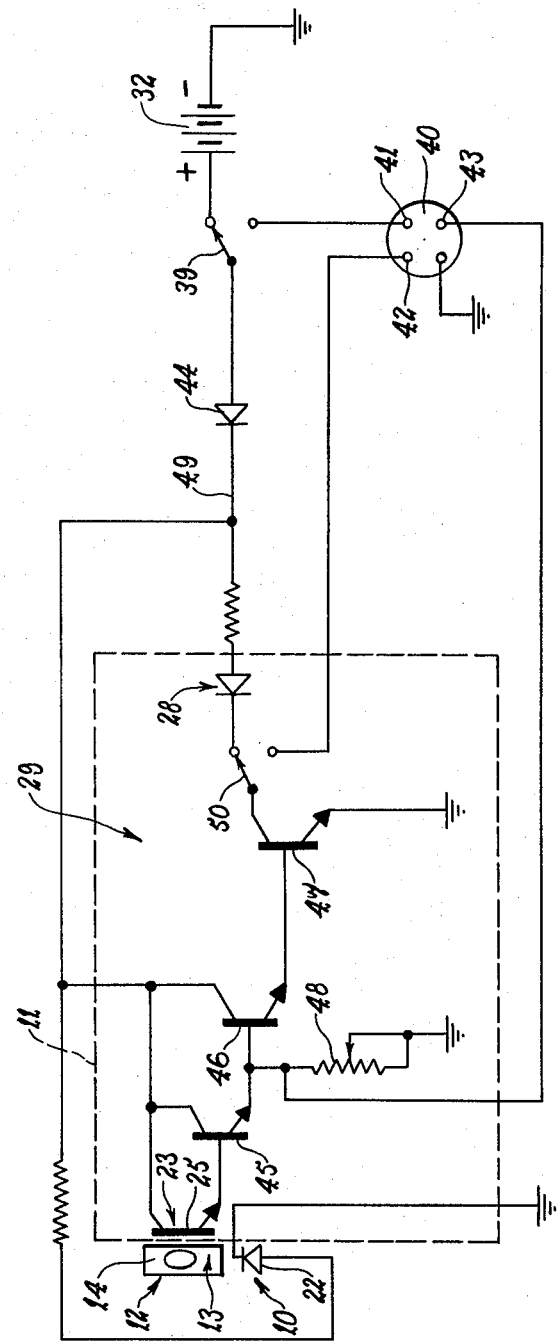
FIG. 3 is a circuit diagram representing a further embodiment of apparatus according to the present invention.

The radiation emitting means 10 is preferably a source of electromagnetic radiation and may be an incandescent light bulb 21 (FIG. 2) or a light emitting diode 22 (FIGS. 1 and 3). The emitting means may alternatively be a glass fibre having one end located to receive light from externally of the apparatus, e.g., from the sun, and the other end to emit light towards the modulating means 12. The emitting means 10 is preferably a light emitting diode since such devices are durable and light is emitted predominantly from one surface, peripheral light emission being very small.

The radiation receiving means preferably includes radiation detecting means 23 sensitive to the intensity of radiation impinging thereon. The detecting means 23 is preferably a photocell and may be a photoconductivity type cell 24 (FIG. 2) or a photo-transistor 25 (FIGS. 1 and 3). A photo-conductivity type cell has a resistance which varies with the amount of radiation impinging on the sensitive part thereof.

A light emitting diode 22a and a detecting means 23a may be located on opposite sides of the chamber 13 as shown in broken line in FIG. 1. The tube 16, modulating liquid 14 and bubbles 15 diffract light so that when the bubble 15 is directly interposed between the diode 22a and the detecting means 23a, which occurs when the member is in the chosen orientation, minimum light is impinging on the detecting means 23.

Preferably however as illustrated in FIG. 1 the light emitting diode 22 is positioned adjacent end 17 of tube 16 for emitting light longitudinally into the tube 16, and the detecting means 23 is positioned to receive light deflected laterally by an end edge 26 of the bubble 15. Images of the light source are formed at the end edges of the bubble and hence when the edge 26 is closest to the detecting means 23 maximum light is impinging thereon. The apparatus is calibrated to achieve this state when the member is in the chosen orientation. The bubble 15 as mentioned above has a length greater than half the length of the tube 16 so that quite a substantial clockwise tilt of the tube 16 of FIG. 1 would be required before the light source image formed at the end edge of the bubble remote from end edge 26 could be detected by the detecting means 23.

FIG. 1 illustrates the tube 16, emitting means 10 and detecting means 23 encased in a pre-fabricated module 27 in predetermined relationship to each other to thereby provide a replaceable component for the apparatus. The module 27 may be a clear plastics material and serves to protect the components. The lead terminals 28 of the diode 22 and photo-transistor 28 protrude from the module 27 to facilitate electrical connection.

In FIGS. 2 and 3 there is illustrated radiation receiving means 11 which includes detecting means 23. The receiving means 11 also includes orientation signalling means 28 and a switching network 29 for switching the signalling means 28 in response to changes in intensity of radiation impinging on the detecting means 23. The signalling means 28 may be adapted to be activated when the member is in the chosen orientation or may be deactivated at such a time.

The signalling means 28 may be visual signalling means, for example a signal lamp 30 (FIG. 2) or a light emitting diode 31 (FIG. 3). Alternatively or in conjunction with the visual signalling means there may be provided an audible signal generator. The signalling means 28 may have a light source operative when the chosen orientation is not detected by the apparatus and an audible signal generator operative when the chosen orientation is reached or vice-versa. The signalling means 28 may alternatively be a radio transmitter so that the apparatus can be used to indicate orientations at a distance remote from the member.

The switching network 29 illustrated in FIG. 2 is powered by a battery 32 connectable to the network by control switch 33. The network 29 includes a switching member 34 illustrated as a first NPN transistor 35. The transistor 35 has two discrete states, conducting and non-conducting, and is in one state when the member is in the chosen orientation and in the other state when the member is not in the chosen orientation. The network 29 also includes a second NPN transistor 36. The two transistors 35 and 36 are shown cnnected with common collector terminals and the emitter of the first transistor 35 is connected to the base of the second transistor 36. For NPN transistors the battery 32 preferably has its negative terminal connected via the control switch 33 to earth. The positive terminal of the battery may be connected via the signalling means 28 to the common collector of the transistors 35 and 36 and the emitter of the second transistor 36 is earthed to complete the signalling circuit. Therefore when the transistors 35 and 36 are switched on the signalling means 28 will be activated.

The bias network for the transistors 35 and 36 is preferably adjustable to enable variation of the time when the transistors switch from a conducting state to a non-conducting state and vice-versa. Adjustment of the bias network is preferably achieved by providing two variable resistors 37 and 38 to vary the potential applied to the base of the first transistor 35 and hence vary the switching off times of the transistors 35 and 36. Variable resistor 37 is shown connected between the positive terminal of the battery 32 and the base of the first transistor 35, the second variable resistor 38 being connected between the base of the first transistor 35 and earth. The photoconductivity type cell 24 is connected in parallel across the second variable resistor 38 although it may be connected in series with the second variable resistor 38 or in parallel or series with the first variable resistor 37.

In the embodiment illustrated in FIG. 1 the signalling means 28 includes a signal lamp 30 connected between the common collector of the two transistors 35 and 36 and the positive terminal of battery 32. There may be provided a change-over switch (not shown) which is operable to switch the common collector terminal of the two transistors 35 and 36 across to a terminal of an audible signal generator the other terminal of which is connected to the positive terminal of the battery 32. By means of this change-over switch the apparatus of the present invention may selectively use a signal lamp or an audible signal generator as the signalling means 28.

In another embodiment of the present invention which is not illustrated the signalling means 28 is replaced by a relay. The relay may be operable when the transistors 35 and 36 are not conducting to connect the audible signal generator in circuit. When the transistors 35 and 36 become conducting the relay switches the audible signal generator out of circuit and switches a signal lamp into circuit. This embodiment enables an audible signal to be generated when the apparatus is indicating an orientation that is not the chosen orientation and a visual signal to be generated when the apparatus indicates that the member is in the chosen orientation.

In operation the bias network is calibrated so that the transistors 35 and 36 are either just on or just off. This is desirable for maximum sensitivity of the apparatus.

The detecting means 23 is illustrated as a photo-conductivity type cell 24 connected in parallel across the second variable resistor 38. Minimum light reaches the photo-conductivity type cell 24 when the bubble 15 is directly interposed between the light bulb 10 and the cell 24. Minimum impinging light on the cell 24 maximizes its resistance. Therefore, in use, the embodiment of FIG. 2, will be adjusted by means of variable resistors 37 and 38 so that the transistors 35 and 36 are just on when the light impinging in the cell 24 is at a minimum. This occurs when the member is in the chosen orientation. From this position any movement of the bubble 15 from its directly interposed position produced by changing the orientation member will result in increased light incidence on the cell 24 whose resistance will decrease and the potential from the base of the first transistor 35 to the emitter of the second transistor 36 will decrease and the transistors 35 and 36 will switch off. This will switch off the signalling means 28. If the cell 24 is connected in series with the first variable resistor 37 the bias network can be adjusted so that the signalling means 38 is just off at the chosen orientation of the member.

The apparatus of the present invention may be used to measure vertical or horizontal by providing two modulating means 12, one for horizontal and one for vertical measurement, each having an associated radiation detecting means 23 such as a photocell. The switching network 29 may be provided with a change-over switch for example to switch the photocell associated with the horizontal indicating tube out of parallel with the second variable resistor 38 and simultaneously switch the photocell associated with the vertical indicating tube into parallel with the second variable resistor 38 and vice-versa. Thus a common switching network 29 may be used for vertical and horizontal indication. It will be apparent that the modulating means can be tilted to give maximum or minimum radiation transfer to the detecting means at inclinations other than horizontal or vertical and so the apparatus of the present invention can be readily used to indicate when any chosen angular orientation is reached.

The embodiment illustrated in FIG. 3 includes a switching network 29 which is more stable than the FIG. 2 embodiment. The network 29 is powered by battery 32. A change-over switch 39 may be provided to enable the circuit to be powered by a remote power source connectable to terminal 41 of socket member 40. A protection diode 44 is included to ensure correct polarity of the supply voltage.

The network 29 further includes first, second and third switching transistors 45, 46 and 47 respectively. The first transistor 45 has its base connected to the emitter of photo-transistor 25 so that when sufficient light is impinging thereon the first transistor 45 is conducting. The emitter of the first transistor 45 is connected to the base of the second transistor 46 and also via variable resistor 48 to earth. Variable resistor 48 may be adjusted to vary the time at which transistor 46 switches on. External control of the switching time may be achieved by a by-passing variable resistor 48 by an external variable resistor connected to terminal 43 of socket member 40.

In use the variable resistor 48 is adjusted so that the transistor 46 is just on when maximum light is impinging on photo-transistor 25. This occurs when bubble 15 has its reflecting end edge 26 adjacent the photo-transistor 25 in FIG. 1. When second transistor 46 switches on their transistor 47 also switches on. The collector of transistor 47 is connected to supply line 49 via the light emitting diode 31 and a resistor. The light emitting diode 31 therefore in the illustrated embodiment is illuminated when maximum light is impinging on photo-transistor 25 which occurs when the member is in the chosen orientation. Movement of the member reduces the light detected by the photo-transistor 25 by bubble 15, which switches transistor 47 off and hence also light emitting diode 31. A signal change-over switch 50 may be provided to enable external indication of orientation to a signalling means connected to terminal 42 of socket member 40.

In FIG. 3 the variable resistor 48 may be connected between the base of the third transistor 47 and earth to achieve the same results as described above various modifications may be made to the apparatus arrangement and the circuitry to suit different purposes. A light emitting diode may be provided at each end of a tube so that light is deflected laterally from both end edges of the bubble. Two detecting means may be provided and a net maximum intensity of light impinging on the two detecting means may be identified to indicate that the member is in the chosen orientation.

When two modulating means are provided one being tilted to the right without breaking the surface tension holding the bubble and one to the left a bridge type detection circuit may be used to identify when the member is in the chosen orientation. Two switching circuits, one for each modulating means, are provided and a centre circuit is provided for identifying when both circuits are indicating that the member is in the chosen orientation. If either switching circuit is indicating a state other than the chosen orientation the centre circuit is deactivated.

Preferably the orientation indicating apparatus of the present invention is located in a housing. A housing serves to protect the components of the apparatus and also exclude stray light that may upset readings on the sensitive surface of the photocell. If a signal lamp is used as the signalling means then this preferably protrudes from the outside of the housing. The housing may be pivotally mounted on a support bracket. If the apparatus is to be mounted on a spirit level the pivotal mounting enables the apparatus to be adjusted to signal horizontal at the same time as the spirit level indicates horizontal. The support bracket may be attachable to a spirit level by a clamp screw in a similar fashion to a G-clamp. Alternatively the housing may be provided with magnetic feet which are used for attaching the apparatus on the side of a spirit level by means of steel plates secured to the spirit level. The housing may be rigidly secured to a spirit level and the inclination of the modulating means may be ajusted and set by means of a pivotal mounting base 19 on which the modulating means 12 is mounted.

The orientation indicating apparatus may be used to sight telescopes, binoculars or cameras at any chosen orientation. For example accurate surveyors' instruments may be constructed using the principles of the present invention.

As mentioned previously the present invention is useful in the building industry to enable determination of levels where a common spirit level cannot be readily utilized. The invention may also be used to provide an automatic check on the orientation of a plumb line. A plumb bob containing two mutually perpendicular horizontal tubes may be used for detecting variations of a plumb line from true vertical in any direction.

The apparatus of the present invention may be used to detect changes in orientation and may be connected to a counter or register for counting the number of such changes. For example the number of steps a walker makes may be recorded by counting the number of times a leg moves as indicated by each movement of the bubble in a chamber past a central position.

The apparatus of the present invention may also be used to indicate or provide a signal for automatically compensating for changes in orientation of an aircraft. Variation from horizontal of the line from nose to tail and/or from wing tip to wing tip may be detected and indicated.

Thus it will be seen that the orientation indicating apparatus of the present invention is of relatively simple and inexpensive construction, enables one to test orientation in locations where conventional orientation indicating apparatus is unpractical, and can readily be of robust construction.

Finally it is to be understood that various minor alterations and modifications may be made to the invention as hereinbefore described without departing from the spirit and scope thereof as defined in the appended claims.

Having now described my invention, what I claim as new and desire to secure by Letters Patent is:

1. Orientation indicating apparatus for applying to a member to indicate when the member is in a chosen orientation, said apparatus including: radiation modulating means having a chamber charged with modulating liquid defining an orientation bubble movable therein according to the orientation of the modulating means, radiation emitting means positioned to emit radiation into said chamber so as to impinge on said bubble depending on the orientation of the modulating means, and radiation receiving means including radiation detecting means positioned to receive radiation deflected laterally by said bubble and said receiving means being arranged to generate an identification signal when the radiation received from the bubble is at a maximum intensity; the arrangement and placement of the emitting means and detecting means relative to the modulating means being such that when the member is in the chosen orientation, radiation from the emitting means passes through the modulating liquid, impinges on a near boundary of the bubble, and is deflected laterally thereby so as to be received with maximum intensity by the detecting means thus producing the identification signal.

2. Orientation indicating apparatus as claimed in claim 1 wherein said chamber is defined by an elongated tube and the orientation bubble has a length greater than half the length of the tube.

3. Orientation indicating apparatus as claimed in claim 1 wherein said radiation emitting means comprises a light emitting diode positioned adjacent an end of said chamber.

4. Orientation indicating apparatus as in claim 1 wherein said radiation modulating means is supported on a mounting base, the mounting base being adjustably mounted on the member.

5. Orientation indicating apparatus as claimed in claim 1 wherein said chamber, radiation emitting means and radiation detecting means are encased in a pre-fabricated module in predetermined relationship to each other to thereby provide a replaceable component for the apparatus.

6. Orientation indicating apparatus as claimed in claim 1 wherein when the apparatus is indicating that the member is in the chosen orientation the chamber is tilted from a central chosen orientation indicating position by an amount insufficient to break the surface tension holding the bubble in said indicating position whereby upon further tilting of the chamber the surface tension holding the bubble breaks and the apparatus ceases to indicate that the member is in the chosen orientation.

7. Orientation indicating apparatus as claimed in claim 1 wherein said radiation receiving means further includes orientation signalling means, and a switching network for switching said signalling means in response to changes in intensity of radiation impinging on said detecting means.

8. Orientation indicating apparatus as claimed in claim 7 wherein said switching network includes a switching member having two discrete states, said switching member being in one state when the member is in the chosen orientation and in the other state when the member is not in the chosen orientation.

9. Orientation indicating apparatus for applying to a member to indicate when the member is in a chosen orientation, said apparatus including: radiation modulating means having an elongated chamber charged with modulating liquid defining an orientation bubble movable therein according to the orientation of the modulating means, a light emitting diode positioned against one end of said chamber to emit light longitudinally into said chamber so as to impinge on the edge of said bubble nearest to said diode, and light receiving means including light detecting means having a relatively small light sensitive surface positioned to receive light deflected laterally by said edge of the bubble and said receiving means being arranged to generate an identification signal when the light received from the bubble is at a maximum intensity; the arrangement and placement of the diode and detecting means relative to the modulating means being such that when the member is in the chosen orientation light from the diode passes along the chamber through the modulating liquid, impinges on said edge of the bubble, and is deflected laterally thereby so as to be received with maximum intensity by the detecting means thus producing the identification signal.

* * * * *